United States Patent
Gentili et al.

(10) Patent No.: US 10,783,240 B2
(45) Date of Patent: Sep. 22, 2020

(54) SECURE ENVIRONMENT IN A NON-SECURE MICROCONTROLLER

(71) Applicant: STMICROELECTRONICS, INC., Coppell, TX (US)

(72) Inventors: Maurizio Gentili, Santa Clara, CA (US); Massimo Panzica, Biancavilla (IT)

(73) Assignee: STMICROELECTRONICS, INC., Coppell, TX (US)

( * ) Notice: Subject to any disclaimer, the term of this patent is extended or adjusted under 35 U.S.C. 154(b) by 119 days.

(21) Appl. No.: 15/721,362

(22) Filed: Sep. 29, 2017

(65) Prior Publication Data

US 2019/0102538 A1    Apr. 4, 2019

(51) Int. Cl.
G06F 21/53 (2013.01)
G06F 21/56 (2013.01)
(Continued)

(52) U.S. Cl.
CPC .............. *G06F 21/53* (2013.01); *G06F 13/24* (2013.01); *G06F 13/28* (2013.01); *G06F 21/575* (2013.01);
(Continued)

(58) Field of Classification Search
CPC .......... G06F 21/53; G06F 21/74; G06F 21/79; G06F 21/575; G06F 13/24; G06F 13/28; H04L 63/061; H04L 63/0853
See application file for complete search history.

(56) References Cited

U.S. PATENT DOCUMENTS

2009/0204823 A1\* 8/2009 Giordano ............ G06F 11/3648
  713/190
2014/0359788 A1\* 12/2014 Laine .................... G06F 21/572
  726/27

(Continued)

OTHER PUBLICATIONS

Oscar Guillen, Bhargavi Nisarga, Luis Reynoso, and Ralf Brederlow. "Crypto-Bootloader: Secure in-field firmware updates for ultra-low power MCUs", Texas Instrument publication, Sep. 2015.\*

(Continued)

*Primary Examiner* — Noura Zoubair
(74) *Attorney, Agent, or Firm* — Seed IP Law Group LLP

(57) ABSTRACT

A secure engine method includes providing an embedded microcontroller in an embedded device, the embedded microcontroller having internal memory. The method also includes providing a secure environment in the internal memory. The secure environment method recognizes a boot sequence and restricts user-level access to the secure environment by taking control over the secure environment memory. Taking such control may include disabling DMA controllers, configuring at least one memory controller for access to the secure environment, preventing the execution of instructions fetched from outside the secure environment, and only permitting execution of instructions fetched from within the secure environment. Secure engine program instructions are then executed to disable interrupts, perform at least one secure operation, and re-enable interrupts after performing the at least one secure operation. Control over the secure environment memory is released, which can include clearing memory, re-enabling DMA controllers, and restoring memory controller parameters.

22 Claims, 5 Drawing Sheets

(51) Int. Cl.
- *G06F 13/28* (2006.01)
- *G06F 13/24* (2006.01)
- *H04L 29/06* (2006.01)
- *G06F 21/57* (2013.01)
- *G06F 21/74* (2013.01)
- *G06F 21/79* (2013.01)

(52) U.S. Cl.
CPC ............. *G06F 21/74* (2013.01); *G06F 21/79* (2013.01); *H04L 63/061* (2013.01); *H04L 63/0853* (2013.01); *G06F 2213/24* (2013.01); *G06F 2221/2143* (2013.01); *G06F 2221/2149* (2013.01)

(56) References Cited

U.S. PATENT DOCUMENTS

2017/0289151 A1* 10/2017 Shanahan ............ H04L 63/0876
2019/0095623 A1*  3/2019 Narasimhan .......... G06F 21/572

OTHER PUBLICATIONS

Arm, "Cortex-M4," Technical Reference Manual, revision r0p0, 2009, 117 pages.
Extended European Search Report, dated Jan. 30, 2019, for European Application No. 18194414.1-1218, 8 pages.
Sanfilippo, "Security with STM32& Secure Elements," STMicroelectronics, STM32, Mar. 7, 2016, 26 pages.
STMicroelectronics NV, "Proprietary code read out protection (PCROP) on STM32F72xxx and STM32F73xxx microcontrollers," Application note AN4968, Feb. 2017, 46 pages.
STMicroelectronics NV, "Proprietary code read-out protection (PCROP), software expansion for STM32Cube," data brief X-CUBE-PCROP, Jan. 2017, 3 pages.
STMicroelectronics NV, "Proprietary code read-out protection on microcontrollers of the STM32F4 Series," Application note 4701, Nov. 2016, 38 pages.
STMicroelectronics NV, "STM32L0/L4 Firewall overview," Application note AN4729, Aug. 2015, 3 pages.
STMicroelectronics NV, "STM32L100xx, STM32L151xx, STM32L152xx and STM32L162xx advanced ARM®-based 32-bit MCUs," Reference Manual RM0038, Sep. 2016, 908 pages.
STMicroelectronics NV, "Ultra-low-power STM32L0x1 advanced ARM®-based 32-bit MCUs," Reference Manual RM0377, Feb. 2016, 874 pages.
STMicroelectronics, "IoT Security Good practice," Secure MCUs Division, Nov. 2016, 15 pages.
STMicroelectronics, "Proprietary Code Read Out Protection on STM32L1 microcontrollers," Application note AN4246, Apr. 2013, 11 pages.
STMicroelectronics, "ST Technology Tour Invitiation," informational flyer, 2017, 8 pages.
STMicroelectronics, "STM32 ST-LINK Utility software description," User Manual UM0892, May 2014, 41 pages.
STMicroelectronics, "System Memories Protections," STM32L4, Revision 1.0, 18 pages.
Waskiewicz, "Platform Level Security for IoT Devices," STMicroelectronics, Technology Tour 2017, 63 pages.

\* cited by examiner

SECURE ENVIRONMENT IN A NON-SECURE MICROCONTROLLER

BACKGROUND

Technical Field

The present disclosure generally relates to microcontrollers of the type often used in embedded applications. More particularly, but not exclusively, the present disclosure relates to a microcontroller arranged for operations in a secure environment.

Description of the Related Art

Microcontrollers are a class of integrated circuits that contain a microprocessor and at least some memory in a same integrated circuit package. In some cases, all of the memory that is accessible by the microprocessor is contained within the integrated circuit package. In other cases, a first portion of memory is contained in the integrated circuit package, and a second portion of memory is outside of the integrated circuit package and accessible to the microprocessor via one or more data paths (e.g., buses).

In addition to a microprocessor and memory, microcontrollers will also typically include at least one input/output (I/O) control circuit. The I/O control circuitry provides the microcontroller with an architecture for interacting with the outside world. Via the I/O control circuitry, any number and any type of input device may be electrically coupled to the microcontroller to provide data for processing by the microprocessor. Along these lines, the I/O control circuitry may also be arranged to pass data generated by the microcontroller to the outside world.

Microcontrollers may be found in retail devices, consumer devices, industrial equipment, medical devices, vehicles, and devices of nearly any other class or technology area. The devices may be battery powered or powered by a hard-wired source. The devices where microcontrollers are employed may be portable, fixed, or some combination thereof. Without any limitation, microcontrollers are used to take data from sensors of all types (e.g., temperature, time, humidity, acceleration, motion, switches, triggers, and the like), and microcontrollers are used to provide data to the outside world (e.g., visual, audio, and haptic annunciators, switches, triggers, and the like).

FIG. 1 is a block diagram showing a conventional microcontroller architecture 10. In the microcontroller 10, a microprocessor 12 is arranged for data communications with memory 14. Memory 14 includes physical memory and the control circuitry to pass information into and from the physical memory to other circuits of microcontroller 10. Memory 14 may optionally also include other circuits that are accessed using a memory-style interface. The physical memory of memory 14 may be volatile memory or non-volatile memory. The memory 14 illustrated in FIG. 1 includes random access memory (RAM) 14a, flash memory 14b, and optional other circuits 14c coupled via a memory-style interface. Each of the types of memory, RAM 14a, flash 14b, and optional other circuitry 14c, is located onboard the microcontroller 10. As represented by the dashed lines, each of the types of memory may also have a portion that is external to the integrated circuit package of microcontroller 10.

The microprocessor 12 and the memory 14 of microcontroller 10 are organized according to a memory space that has a determined "width." The "width" is often based on how much data a given microprocessor 12 can concurrently process, and along these lines, the "width" is often mirrored by the number of "bits" concurrently passed over one or more buses that move data within the microcontroller 10.

In the illustration of FIG. 1, the microcontroller 10 has a 32-bit wide architecture. Considering that each unique address in a physical memory device is typically arranged to store a single byte of data, the 32-bit wide architecture can uniquely address four gigabytes (4 GB) of data. This architecture is illustrated in FIG. 1 as a memory map 16 that spans the entire 4 GB of addressable space. Stated differently, using hexadecimal notation, the individual addresses of the memory map 16 may count from 0x0000-0000 to 0xFFFF-FFFF (i.e., 0 to 4,294,967,295 in decimal (base-10) notation).

The microprocessor 12 of microcontroller 10 may address any bit, nibble, byte, half-word, word, double-word, quad-word, or the like in the memory map 16. If a system engineer locates a device (e.g., a memory, a PCI-bus, a USB host controller, or the like) on a 32-bit memory bus, and if the device has its own individual or set of 32-bit addresses, then the microprocessor 12 will be able to access the device by placing a set of data bits representing the device address on the 32-bit memory bus. In the microcontroller 10, every one of the unique addresses in the memory map 16 are accessible by the microprocessor 12.

The microcontroller 10 of FIG. 1 includes I/O circuitry 18, administrative circuits 20, interrupt processing circuitry 22, direct memory access (DMA) circuitry 24, and optionally other circuits too (not shown). The I/O circuitry 18 operates as described herein to receive data from the outside world and to provide data to the outside world.

The administrative circuitry 20 may include any number logic modules. The logic modules may be arranged to include or otherwise manage clocks, oscillators, timers, power modes, an audio interface, analog/digital features (e.g., an analog-to-digital controller (ADC); a digital-to-analog controller (DAC)), communication interfaces, debug interfaces, and the like.

The interrupt processing circuitry 22 is arranged to process planned and unplanned interruptions to normal processing by the microprocessor 12. The interrupts may be synchronous or asynchronous to a system clock. Examples of planned interruptions include expiring timers, certain I/O control circuit inputs (e.g., keypresses, serial or parallel incoming data, and the like). Examples of unplanned interrupts include imminent loss of power interrupts, resets, error traps, watchdog timeouts, and the like.

The DMA circuitry 24 operates to copy data from one location in the microcontroller 10 to another location without using the microprocessor 12 to execute the copying. For example, data stored in one area of RAM 14a can be automatically copied to another area of RAM 14a by loading various registers of the DMA circuitry 24. Except for setting the registers with appropriate values, the copying operation happens autonomously without any further intervention from the microprocessor 12. Typically, the DMA circuitry 24 is used to copy large amounts of data. In another example, the other circuitry 14c includes a universal serial bus host controller. In this example, the DMA circuitry 24 may be used to copy bulk data between the USB host controller of the other circuitry 24 and the RAM 14a.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

A firmware architecture described in the present disclosure combines particular mechanisms and strategies to perform secure functions while protecting secret information, such as secure keys, in a general purpose microcontroller. The firmware innovatively combines IPs and selected functionality to create a secure enclave. This allows a set of functions that perform secure operations (e.g., cryptographic operations, keys handling, and read/write of sensitive data) to be shared between independent applications running in different memory areas of a single device. An example of such independent applications is a secure firmware update application, a secure boot function, a secure firmware update/install function, and an independent user application. Access to the secure operations is through a set of application programming interfaces (API's) that implement the secure functions as a "secure engine."

In a first embodiment, a secure engine method includes providing a secure environment in an internal memory of a microcontroller. The secure environment has secure engine program instructions executable by a microprocessor of the microcontroller. The method also includes restricting user-level access to the secure environment and recognizing a boot-sequence of the microcontroller. After recognizing the boot-sequence, the method includes disabling all direct memory access (DMA) controllers of the microcontroller that are configurable to access memory of the secure environment, configuring at least one memory controller of the microcontroller for access to the secure environment, preventing the microprocessor of the microcontroller from executing instructions fetched from outside the secure environment, and only permitting execution of instructions fetched from the secure environment. Various ones of the secure engine program instructions are executed as a state machine, and this includes disabling interrupts, performing at least one secure operation after interrupts are disabled, and enabling interrupts after performing the at least one secure operation. The method also includes clearing memory, restoring an enabled/disabled status of each DMA controller disabled after recognizing the boot-sequence, and performing user-level operations.

In some cases of the first embodiment, the secure engine program instructions executable by the microprocessor of the microcontroller are stored in a non-volatile memory. In these or in some other cases of the first embodiment, the microcontroller is an embedded microcontroller in an embedded device, and the at least one secure operation includes a secure boot of the embedded device, and in others of these types of embodiments, the at least one secure operation includes an update to firmware of the embedded device In some other cases of the first embodiment, the at least one secure operation includes a signature verification function, and/or the act of performing at least one secure operation includes accessing protected cryptic values.

In some cases of the first embodiment, the microcontroller is an embedded microcontroller in an embedded device, and the embedded device is a wearable device; and in these or some other cases, the embedded device is an Internet of Things device. In some cases, after recognizing the boot-sequence, a firewall to protect the secure environment is enabled, and executing various ones of the secure engine program instructions as the state machine includes executing a call gate function to open an area of access within the secure environment. In some of the cases where a firewall is implemented, after performing at least one secure operation, a second call gate function closes the area of access within the secure environment.

In a second embodiment, an Internet of Things (IoT) device includes a microcontroller having a microprocessor and a memory configured internal to the microcontroller. Here, the internal memory has a secure environment configured therein, and the secure environment has secure environment configuration instructions executable by the microprocessor and secure engine program instructions executable by the microprocessor. After recognizing a boot-sequence, the microprocessor is directed to, via the secure environment configuration instructions, disable each direct memory access (DMA) controller that is configurable to access memory of the secure environment, and configure at least one memory controller for access to the secure environment. The secure environment configuration instructions also direct the microprocessor to prevent the microprocessor from executing instructions fetched from outside the secure environment. Via the secure engine program instructions, the microprocessor is directed to only permit execution of instructions fetched from the secure environment. The secure engine program instructions also direct the microprocessor to disable interrupts, perform at least one secure operation after interrupts are disabled, and enable interrupts after performing the at least one secure operations. Via the secure environment configuration instructions, the microprocessor is directed to clear memory, and restore an enable/disable status of each DMA controller disabled after recognizing the boot-sequence.

In some cases of the second embodiment, the IoT device is arranged as a wearable computing device. And in some embodiments, the IoT device includes a communications interface and at least one sensor. Here, the at least one sensor is arranged to provide sensor data to the microcontroller. In these or in other cases of the second embodiment, the at least one secure operation is a cryptographic operation, or the at least one secure operation is a secure key operation.

In a third embodiment, a non-transitory computer-readable storage medium has stored contents that configure a computing system to implement a secure engine method. The secure engine method includes restricting user-level access to a secure environment defined in the non-transitory computer-readable storage medium and detecting a boot-sequence. After detecting the boot-sequence, the method includes disabling direct memory access (DMA) controllers, configuring at least one memory controller for access to the secure environment by the secure engine, and preventing execution of any instructions fetched from outside the secure environment. The method also includes executing secure engine program instructions, which includes disabling interrupts, performing at least one secure operation after interrupts are disabled, and enabling interrupts after performing the at least one secure operation. The method further includes clearing at least some volatile memory, re-enabling the disabled DMA controllers, and performing user-level operations.

In some cases of the third embodiment, after detecting the boot-sequence, the method includes enabling a firewall to protect the secure environment. Here, performing the at least one secure operation includes executing a call gate function to open an area of access within the secure environment. In some of these embodiments, after performing the at least one secure operation, the method includes executing a second call gate function to close the area of access within the secure environment.

In still other cases of the third embodiment, the at least one secure operation includes a secure boot operation. And in other cases, the at least one secure operation includes a secure firmware update operation.

These features with other objects and advantages which will become subsequently apparent reside in the details of construction and operation as more fully described hereafter and claimed, reference being had to the accompanying drawings forming a part hereof.

This Brief Summary is provided to introduce certain concepts in a simplified form that are further described in detail in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
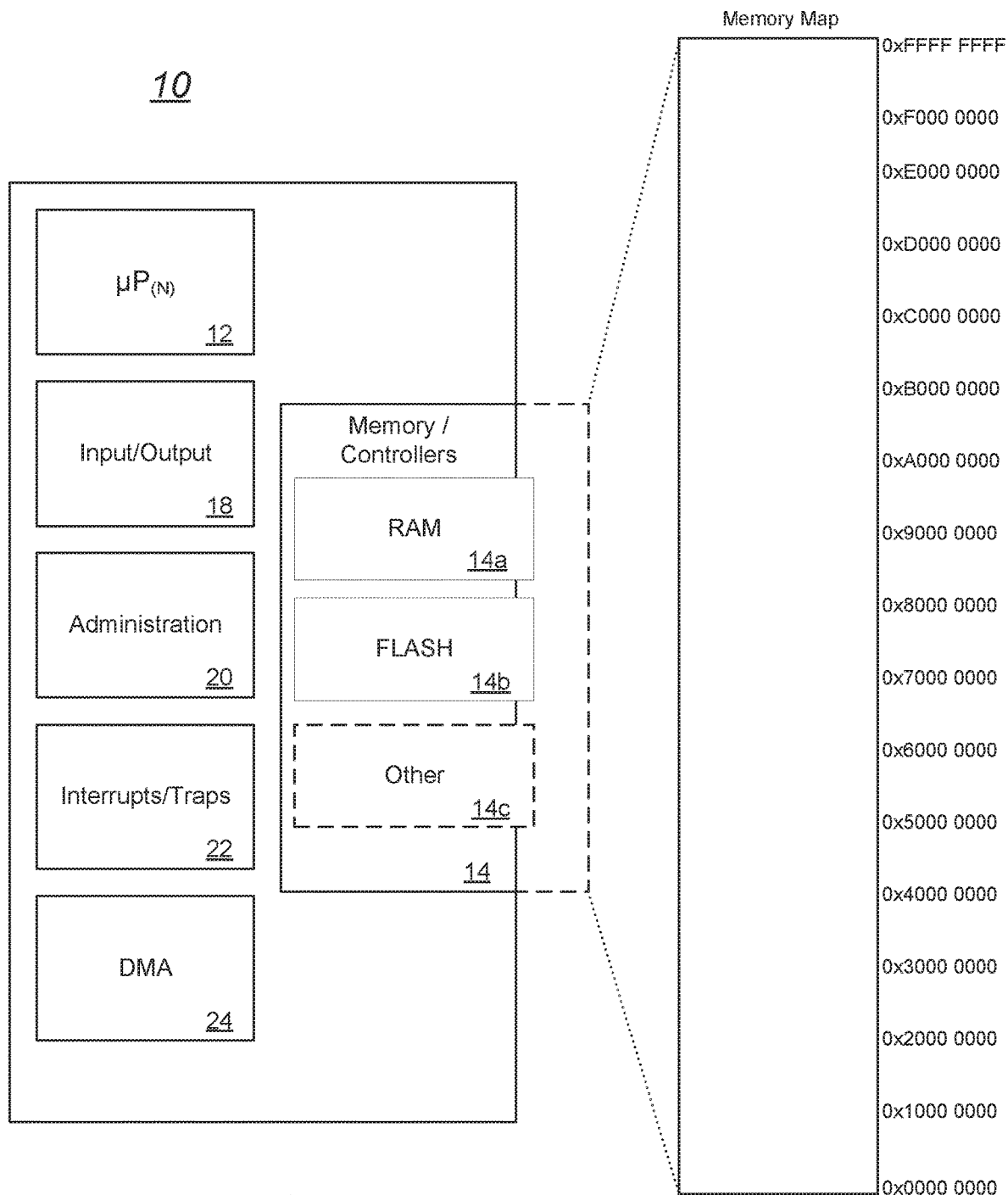
FIG. 1 is a block diagram showing conventional a microcontroller architecture.

It has been recognized by the present inventors that many microcontroller design companies employ particular mechanisms to reduce the success rate of hacking attacks. In many cases, these particular mechanisms include "secure key" operations that are used to combat pirate clone attacks, unauthorized data copying attacks, and attacks that falsely authenticate malicious program instructions or data. One reason that secure keys are employed to prevent malicious software intrusion into the microcontroller is that some data suggests up to 95% of the attacks on microcontrollers are directed towards the software currently in use by the microcontroller.

Secure key operations, however, as conventionally deployed, have shortcomings. For example, the secure keys used to decode or encrypt data are often implemented with an additional microcontroller that is dedicated to security. While such an approach is effective, the additional microcontroller is financially expensive, resource expensive, and real-estate expensive. That is, adding additional computing and support circuitry raises the price of each end product where the microcontroller is deployed, the additional computing and support circuitry takes up space in already-crowded integrated circuits and on already-crowded circuit boards, and the additional computing and support circuitry requires power that is desirably not available.

The disclosure now presented establishes a secure environment, also called a memory protection unit (MPU), within otherwise conventional, unprotected memory. After the secure environment is created, secure keys or any other secret data, secret algorithms, or the like can be uploaded into the secure environment. The secret data can then be used. After the use is completed, then any otherwise unprotected memory, registers, or the like are cleared, and upon clearing these otherwise unprotected resources, other non-secure application software can be executed by the microcontroller in a conventional manner.

One non-limiting embodiment of the present invention includes a microcontroller having a particular configuration. The particular configuration defines a secure environment within the memory address space accessible by the microcontroller's microprocessor. The data stored in the secure environment includes software instructions executable by the microprocessor. If an attempt is made to access the area of memory in the secure environment improperly or otherwise without authorization, the microprocessor will halt operations, thereby preventing the unauthorized access to the secure environment. Alternatively, when the secure environment software instructions are appropriately executed, then secure boot, secure firmware update, or other secure operations are permitted.

When the secure environment software instructions are appropriately executed, the instructions disable certain functions of the microcontroller including operations of the direct memory access (DMA) circuitry and operations of certain communications interfaces (e.g., universal serial bus (USB), peripheral component interface (PCI), and the like). Other particular protections of the microprocessor can be enabled, such as a firewall. After the initial processing to prepare the microcontroller is performed, the secure environment software instructions operate as a secure state machine.

The secure state machine enters a protected enclave environment, disables interrupts, opens a portion or pipe through the firewall, and permits secure operations. The secure operations may include updating firmware for the device where the microcontroller is integrated, accessing private information such as secure keys, banking data, health records, or other secret data. After the secure operations are complete, the previously opened pipe through the firewall is closed, interrupts are re-enabled, and the protected enclave is exited.

The secure operations now having been completed cause an exit from the secure state machine. Memory is then cleared, the firewall and other previously configured protections if they are implemented and changed are restored, and programming returns to normal, user-mode operations.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Figure 2:
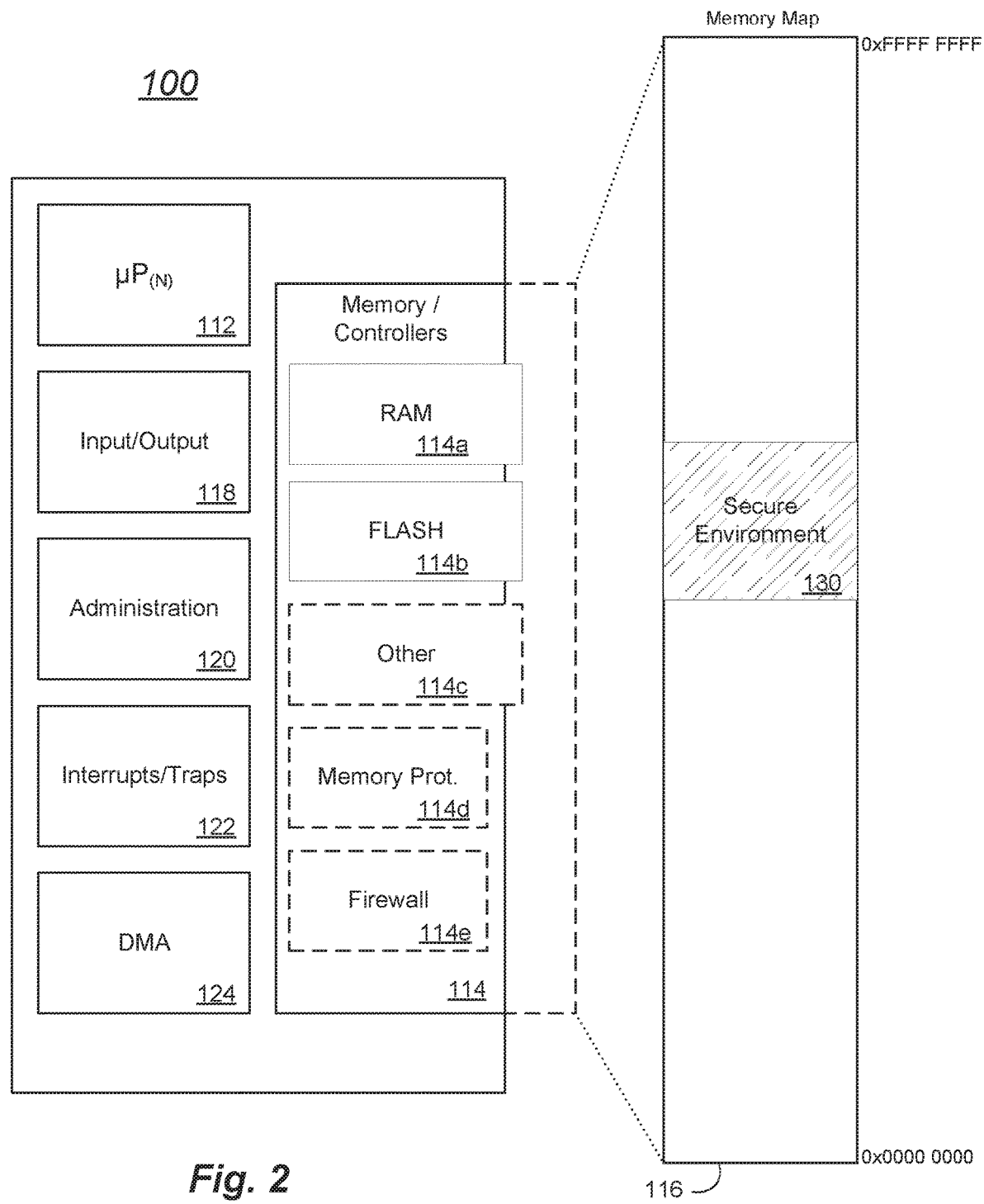
FIG. 2 is a block diagram showing a microcontroller configured to implement a secure environment.

FIG. 2 is a block diagram showing a microcontroller 100 configured to implement a secure environment 130. Microcontroller 100 is formed in one or more embodiments as a collection of electronic structures in a single integrated circuit package (i.e., an integrated circuit). In some embodiments, the structures of microcontroller 100 may be formed in two or more integrated circuit packages, and in some cases, discrete electronic devices and other circuitry are electrically coupled to microcontroller 100 to support various microcontroller functions. The electronic structures that make up microcontroller 100 may be formed with known silicon fabrication processes or other semiconductor manufacturing processes.

In microcontroller 100, a microprocessor 112 is arranged for data communications with memory 114, according to a memory map 116. Each structure, device, and other such means of memory 114, which includes volatile memory such as random access memory (RAM) 114a, non-volatile memory such as flash memory 114b, optional other memory-type circuitry 114c, memory protection logic 114d, and firewall logic 114e may be addressed according to its respective assignment in the memory map 116. Microcontroller 100 also includes input/output (I/O) circuitry 118, administrative function circuitry 120, interrupt circuitry 122, and direct memory access (DMA) circuitry 124.

In the present disclosure, as in FIG. 2, the microprocessor 112 will be understood by ones of ordinary skill in the art in a broad sense. Those ones of ordinary skill in the art will recognize that the term "microprocessor" is used herein for brevity and to facilitate an efficient understanding of the subject matter in the present disclosure rather than to denote only a single device having a particular and specific architectural design. Accordingly, as used herein, a "microprocessor" means one or more microprocessors that operate independently, cooperatively, or both independently and cooperatively. The microprocessor discussed herein may be formed as any one or more of a central processing unit, a graphics processing unit, a video processing unit, a digital signal processor (DSP), or another type of specialized processing unit. And the microprocessor discussed herein may be a microprocessor, a processing core, an execution unity, a controller, a micro controller, processor, a state machine, an arithmetic logic unit (ALU), or another like electronic control circuitry means configured to execute programmed software instructions. These programmed software instructions may be high-level software instructions, compiled software instructions, assembly-language software instructions, machine-code software instructions, object code, relocated or relocatable code, binary code, micro-code, or the like. The programmed software instructions may reside in internal or external memory 114 or they may be hard-coded as a state machine or set of control signals. According to methods and devices referenced herein, one or more embodiments describe software executable by the processor, which when executed, carries out one or more method acts. Accordingly, the microprocessor of the present disclosure includes any electronic device, system, or part thereof that controls at least one operation, and such a device may be implemented in hardware, firmware, or software, or some combination of at least two of the same. The functionality associated with the microprocessor may be centralized or distributed, whether locally or remotely.

Memory 114 includes physical memory, mapped or otherwise virtual memory, one or more memory controllers, one or more memory buses, and other circuitry utilized so that the memory means described in the present disclosure can cooperatively pass data between the microprocessor 112, the memory 114, and certain other circuits of the microcontroller 100. Data passed to and from the certain other circuits optionally includes circuits that are accessed using a memory-style interface as well as circuits that generate or receive control signals associated with memory functions.

The physical memory of memory 114 may be volatile memory or non-volatile memory. The memory 114 illustrated in FIG. 2 includes random access memory (RAM) 114a, which may be static RAM (SRAM), dynamic RAM (DRAM), or some other type of RAM. The volatile RAM 114a may comply with a synchronous memory access protocol, such as SDRAM, and in addition or in the alternative, the volatile memory may comply with an asynchronous protocol. The volatile memory may be organized as one or more types of cache memory physically located close to the microprocessor to reduce data transfer time and to predictively re-use data. In some cases, program instructions executed by the microprocessor 112 are stored in RAM 114a. Memory 114 may also include any form of erasable programmable read only memory (EPROM), which is illustrated in FIG. 2 as flash memory 114b. In some cases, the physical memory of memory 114 is accessed as virtual memory, and the virtual memory may be mapped to physical memory, an electronic device, or some other structure.

In the present disclosure, memory 114 may be used in one configuration or another. The memory may be configured to store data. In the alternative or in addition, the memory may be a non-transitory computer readable medium (CRM) wherein the CRM is configured to store instructions executable by microprocessor 112. These programmed software instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

For the sake of brevity, memory 114 is illustrated in FIG. 2 is including RAM and its associated control circuitry (RAM 114a), flash memory and its associated control circuitry (FLASH 114b), and other optional memory-type circuitry 114c, which may include memory, devices with a memory-type interface, associated control circuitry, and the like. Memory 114 also optionally includes memory protection logic 114d and firewall logic 114e. Each of RAM 114a and FLASH 114b is located onboard the microcontroller 100. Optional other memory-type circuitry 114c, when included, may also be located onboard the microcontroller 100. The optional logic modules, memory protection logic 114d and firewall logic 114e, include special control registers, comparator circuitry, control circuits, and the like, which are located onboard the microcontroller 100. As represented by the dashed lines of memory 114, each of the RAM 114a, FLASH 114b, and optional other memory-type circuitry 114c may also have a portion that is external to the integrated circuit package of microcontroller 100.

Microcontroller 100 of FIG. 2 includes I/O circuitry 118 to receive data from the outside world and to provide data to the outside world. I/O circuitry 118 may include any one or more of dedicated I/O circuits, specialized I/O circuits, general purpose I/O circuits (GPIO), and other types of I/O circuits. The I/O circuitry 118 provides microcontroller 118 with an architecture to interact with the outside world. Any number and any type of input device that is electrically coupled to microcontroller 100 may, via I/O circuitry 118, provide data to microprocessor 112. Along these lines, I/O circuitry 118 is also configurable to pass data in any desirable form from microcontroller 100 to the outside world. In some cases, the I/O circuitry 118 is coupled to other circuitry that provides an opportunity to enter a secure engine process (FIG. 4) of the secure environment 130.

The administrative function circuitry 120 may include any number logic modules. For example, one of the logic modules of the administrative function circuitry 120 manages reset functions. The reset control circuitry may recognize any number of events that reset the microcontroller to a known initialization state. The known initialization state may be a hard-boot state, a soft-boot state, a low-power state, a standby state, a return from standby state, a watchdog timeout state, an external hardware reset state, a software reset state, a firewall protection state, or any other such reset event. Upon a particular reset, the microcontroller 100 will have a set of known values loaded into a set of known configurable registers. The set of known values and corresponding set of known configurable registers may be different for any one or more of the particular reset states discussed herein. In some cases, the known values are hard-wired, hard-coded, factory-set, circuit-board set (e.g., jumper wires, pin headers, or the like), or otherwise not available for change by a programmer or user of the microcontroller 100. In other cases some or all of the known values may be set at the time of manufacture, at the time of first use, or at any other time after a microcontroller 100 is put into service.

Figure 4:
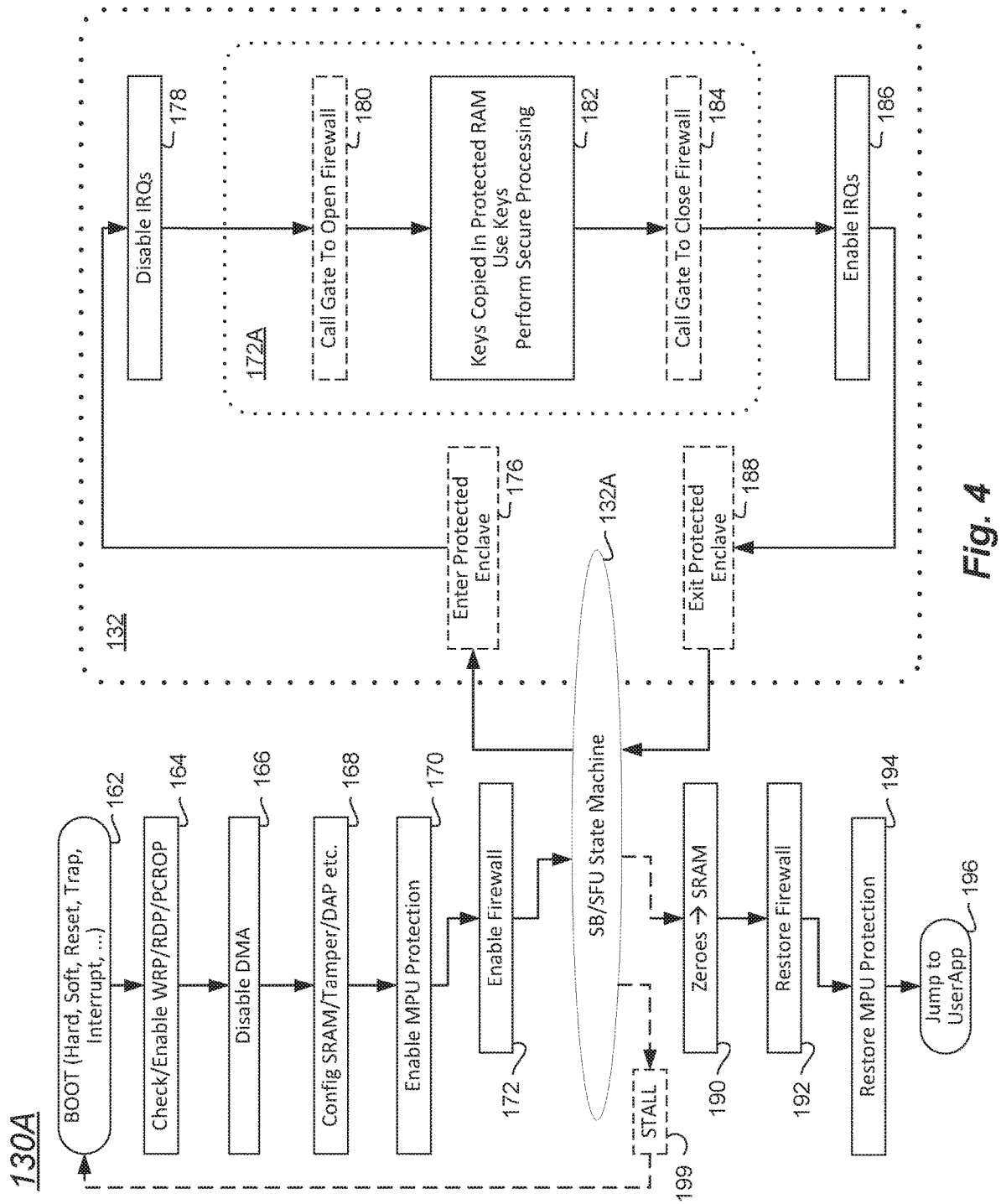
FIG. 4 is a data flow diagram representing use of a secure environment embodiment.

In some embodiments discussed herein, when any one or more types of reset states are entered, the microcontroller may begin to execute a secure engine process (FIG. 4). In some embodiments, there are other ways to enter the secure engine process such as by a particular software command or sequence. In these or yet other embodiments, every time the reset control functionality is invoked, the administrative function circuitry 120 will provide an opportunity to enter the secure engine process (FIG. 4) of the secure environment 130.

Another logic module of the administrative function circuitry 120 is a clock and timer control module. The clock and timer control module includes circuitry to control any one or more of general purpose timers, specialized clock and timer functions, basic timers, low power timers, oscillators, independent watchdog circuits, system window watchdog circuits, real-time clocks, relative-time clocks, time-in-service clocks, and other such clock and timer controls.

The administrative function circuitry 120 may include a power control module. The power control module may be arranged to control any number of power modes of microcontroller 100 including low power modes, full power modes, sleep modes, standby modes, and the like. The power control module may include automatic power scaling circuits (e.g., dynamic voltage scaling), controllable regulation circuits, loss-of-power circuits, and other related power control circuits. In some cases, the power control module is coupled to any one or more of the reset control circuitry, the clock and timer control module, and other modules of microcontroller 100.

In some embodiments, the administrative function circuitry 120 includes an analog/digital features module (e.g., an analog-to-digital controller (ADC); a digital-to-analog controller (DAC); comparator circuitry). In some cases, for example, the ADC circuitry includes a multi-bit (e.g., 8, 12, 16, 24, and the like) ADC that performs successive approximation conversions. DAC circuits, if such circuitry is included, may have a corresponding width or a different width. The analog/digital features may have one or more channels. In some cases, the analog/digital features module includes comparator circuitry. The comparator circuitry may be coupled ADC circuits, DAC circuits, timer circuits, reset circuits, input/output (I/O) circuits, and any number of other circuits. In some cases, the comparator is coupled to an encryption module (e.g., advanced encryption standard (AES), data encryption standard (DES), and the like). The encryption module may include dedicated hardware circuitry, isolated hardware circuitry, obfuscated hardware circuitry, or other types of hardware circuitry. The analog/digital features may be coupled to the power control module, the clock and timer control module, and other modules of microcontroller 100.

A communications module is included in the administrative function circuitry 120. The communications module may include any number of sub-modules, interfaces, media controllers, or the like to provide communications architecture for microcontroller 100. For example, any number of universal asynchronous receiver/transmitter (UART) circuits may be included, and any number of synchronous receiver/transmitter circuits, serial peripheral interface (SPI) circuits, and inter-integrated circuit (I2C) circuits may alternatively or additionally also be included. The communications module may provide communications for debug functions, user functions, audio functions, wired functions, wireless functions, or the like.

Any number of these circuits, modules, sub-modules, and structures described herein may be includes in the administrative function circuitry 120. Any other such means, even those not described herein for brevity, may also be included in the administrative function circuitry 120. Any of these circuits, modules, sub-modules, and structures of the administrative function circuitry 120 may also be directly electrically connected or indirectly electrically coupled to the reset control functionality that provides an opportunity to enter the secure engine process (FIG. 4) of the secure environment 130.

The interrupt processing circuitry 122 is arranged to process planned and unplanned interruptions to normal processing by the microprocessor 112. The interrupts may be synchronous or asynchronous to a system clock. Examples of planned interruptions include expiring timers, certain I/O control circuit inputs (e.g., keypresses, serial or parallel incoming data, and the like). Examples of unplanned interrupts include imminent loss of power interrupts, resets, error traps, watchdog timeouts, and the like. In some cases, one or more interrupt controllers operate autonomously from each other, and in other cases, one or more interrupt controllers operate cooperatively with each other. In this way, interrupt functionality may be nested, prioritized, dedicated, or implemented in other ways. Any one or more interrupt controllers, individual interrupts, or groups thereof can be arranged to invoke operations of the reset control functionality that provides an opportunity to enter the secure engine process (FIG. 4) of the secure environment 130.

The DMA circuitry 124 is configured to provide high-speed data transfer between peripherals and memory as well as memory to memory. The peripherals may include any one or more of the I/O circuitry 118, administrative function circuitry 120, and other memory-type circuitry (e.g., USB host controllers, PCI device, and the like). Memory may include any of the structures of memory 114. Once configured, the DMA circuitry 124 can be used to move data quickly by direct memory access without any further action by microprocessor 112. The DMA circuitry may provide any number of independent, dependent, cooperative, nested, or other channels. The DMA circuitry 124 may be coupled to administrative function circuitry 120, interrupt circuitry 122, or other circuitry that provides an opportunity to enter the secure engine process (FIG. 4) of the secure environment 130.

Microprocessor 112 and memory 114 of microcontroller 100 are organized according to a memory space that has a determined "width." The "width" is often based on how much data a given microprocessor 112 can concurrently process, and along these lines, the "width" is often mirrored by the number of data or instruction "bits" concurrently passed over one or more buses that move data or instructions within the microcontroller 100. In some cases, microcontroller 100 is organized has having a fixed width of 8-bits, 16-bits, 32-bits, 64-bits, 128-bits, or some other width. In other cases, microcontroller 100 is organized as having a default width (e.g., 8-bits, 16-bits, 32-bits, 64-bits, 128-bits, or some other width), and in these cases, the operating width of microcontroller 100 may configured to operate according to a different width.

In the illustration of FIG. 2, the microcontroller 100 has a 32-bit wide address architecture, but the inventive subject matter of the present disclosure is not so limited. The inventive aspects described herein may be suitably applied to other microcontroller devices having other microprocessors fixedly or configurably organized according to a different width.

The memory map 116 of FIG. 2 is shown having a 32-bit wide address space spanning four gigabytes (4 GB), addressable using hexadecimal notation counting from 0x0000-0000 to 0xFFFF-FFFF (i.e., 0 to 4,294,967,295 in decimal (base-10) notation). The microprocessor 112 of microcontroller 100 may address any bit, nibble, byte, half-word, word, double-word, quad-word, or the like in the memory map 116. If a designer of microcontroller 100, or if a system engineer implementing microcontroller 100 in a device, locates a device (e.g., a memory, a PCI-bus, a USB host controller, or the like) on a 32-bit memory bus, and if the device has its own individual or set of 32-bit addresses, then the microprocessor 112 will be able to access the device by placing a set of data bits representing the device address on the 32-bit memory bus. Different from a conventional microcontroller (e.g., microcontroller 10 of FIG. 1), some of the unique addresses in the memory map 116 are not fully accessible by the microprocessor 112.

Memory map 116 of FIG. 2 includes a secure environment 130. The secure environment may be defined by a manufacturer of microcontroller 100, an original equipment manufacturer (OEM) of a device that integrates microcontroller 100, or by an end-user (e.g., a programmer) of microcontroller 100. In some cases, two or more secure environments 130 are created. Multiple secure environments 130 may be created contiguously in memory 114. Alternatively, or in addition, secure environments 130 may be separate and distinct from each other.

The secure environment 130 includes data and secure environment software instructions executable by the microprocessor 112. The secure environment 130 is responsible for managing secret operations (e.g., access to secure keys, cryptographic algorithms, encryption, decryption, signature verification, and the like) in an otherwise non-secure microcontroller 100. In some cases, the secure environment software instructions create a firmware architecture that combines specific mechanisms and strategies, to perform secret functions while protecting secret information (e.g., secure keys, financial information, health information, and the like) in microcontroller 100. These ends may be achieved by combining certain protection mechanisms of microcontroller 100 to create a secure enclave. In this way, a set of functions performing secure operations (e.g., cryptographic operations, secure keys handling, and read/write of sensitive data) can be shared between independent applications running in different memory areas of a single device. One non-limiting example of such application is a secure firmware update to microcontroller 100, and other non-limiting examples include a user application (e.g., a banking application, a payment application, a human identification application to permit physical access to a secure physical space), an Internet of Things (IoT) device, a wearable computing device (e.g., sports device, medical device, and the like), an industrial device, an in-vehicle automotive device, and others. In some cases, the shared set of functions that perform secure (i.e., secret) operations while protecting secret information are exposed by a secure engine applications programming interface (API), which may otherwise be referred to as a "secure engine."

One or more parameters of the secure environment 130 may be fixed or otherwise arranged at design time by a manufacturer or microcontroller 100. In addition, or in the alternative, one or more other parameters of the secure environment 130 may be fixed or otherwise arranged at implementation time by an original equipment manufacturer (OEM) that integrates microcontroller 100 in a particular device such as an embedded device. In these or still other cases, one or more other parameters of the secure environment 130 may be fixed or otherwise arranged at run-time by a programmer that creates program functionality or the embedded or other device provided by the OEM. These parameters may be stored in the microcontroller 100 for use by the control circuitry of at least one of the optional memory protection logic 114*d* and the optional firewall logic 114*e*. When so included, these logic modules include at least some specialized circuitry that enables configuration access to the memory protection and firewall mechanisms at particular times, such as immediately contemporaneous with a boot process.

In order to establish or otherwise implement the secure environment 130, the associated control circuitry of RAM 114*a*, FLASH 114*b*, and the other optional memory-type circuitry 114*c* may include one or more memory protection mechanisms. Alternatively, the one or more memory protection mechanisms may be formed in a separate and distinct memory protection logic 114*d* module. Such mechanisms can be configured to protect portions of memory 114 from unwanted access (i.e., read, write, execute, or any combination thereof), which may include theft of secret data, code hacking, or other malicious access.

One type of memory protection mechanism may include dedicated hardware monitoring circuitry to protect volatile or non-volatile areas of memory 114 that store secure environment software instructions. This proprietary code read-out protection (PCROP) mechanism monitors one or more blocks (e.g., pages, sectors, or the like) of memory, and if a read access, a write access, an instruction execution access (e.g., code fetch) or another type of access is attempted, then the PCROP mechanism prevents such access. In these cases, the microprocessor 112 may stop, may enter a known secure state of limited functionality, or may perform other operations.

In some embodiments, the code that is to be protected using the PCROP mechanism is identified at build time. For example, a flag or some other value may be asserted to trigger particular operations of a compiler tool set. In this way, the microcontroller manufacturer or an OEM may create PCROP-protected areas of the secure environment 130, but a user application may not create, alter, or gain access to PCROP-protected areas. Once PCROP-protected areas are established, they in some embodiments may only be cleared by mass erasure of the protected area of memory 114 or even the entire memory 114.

Another type of memory protection mechanism provided to establish and maintain the secure environment 130 is a read protection (RDPROT) mechanism that provides security against unauthorized read of designated secure areas of memory 114. In some cases, microcontroller 100 provides an RDPROT bit field in a particular register, and this bit field is loaded into a read-only register at boot time (e.g., an event recognized by the reset control circuitry of administrative function circuitry 120).

In at least one embodiment, the RDPROT mechanism deploys three particular protection levels, but less or more than three protection levels are also contemplated. In such embodiments, a first protection level is an effective disabling of the RDPROT mechanism, and if no other protections are enabled, all portions of memory 114 are accessible. The first protection level may be set by loading a first-level protection value (e.g., 0xAA) into an RDPROT configuration register. A second protection level in such embodiments is a memory read protection level that restricts access to certain memory (e.g., secure environment software instructions, secure environment data, certain backup registers, certain memory configuration control registers, and the like).

The second protection level may be set by loading a second-level protection value (e.g., 0x55) into an RDPROT configuration register. The second protection level may also be set automatically when a debugger is connected to microcontroller 100, when a mismatch occurs in data stored certain control registers of microprocessor 112, when values are changed in certain control registers, and in other cases. In some cases, a violation that enables the second protection level of RDPROT can only be reset by re-booting the microprocessor 112 (e.g., an event recognized by the reset control circuitry of administrative function circuitry 120). When the second level of RDPROT is entered (e.g., FIG. 3 at "Data Protection L2"), all access to certain proprietary program memory and data may be prohibited. The microprocessor 112 may further be prevented from executing any secure environment software instructions that are fetched from a volatile section of memory 114 (e.g., RAM 114a). In some cases, any violation of features protected under the second protection level of the RDPROT mechanism causes a hard-reset of microprocessor 112.

The third protection level of the RDPROT mechanism in some embodiments may be set by loading a third-level protection value (e.g., 0xCC) into an RDPROT configuration register. The third protection level may also be entered automatically in some cases. For example, the third protection level can be set when unauthorized operations within a secure environment 130 are attempted. When the third protection level of the RDPROT mechanism is enabled, it may only be possible to boot microprocessor 112 from programmed software instructions stored in FLASH 114b, and in this case, certain debug features (e.g., single-wire communications) are disabled. In some cases, a violation that enables the third protection level of RDPROT can only be reset by re-booting the microprocessor 112 (e.g., an event recognized by the reset control circuitry of administrative function circuitry 120), though in other cases, the third protection level of the RDPROT mechanism may be exited in other ways. While the third protection level of the RDPROT mechanism is enabled, some or all of the memory areas outside of the secure environment 130 may be accessible to user applications.

Yet one more type of memory protection mechanism provided to establish and maintain the secure environment 130 is a write protection (WRPROT) mechanism. The WRPROT logic provides security against unauthorized write and erase operations targeted toward designated areas of memory 114. The designated areas may be inside or outside of the secure environment 130. In some cases, microcontroller 100 provides a WRPROT bit field in a particular register, and this bit field is loaded into a read-only register at boot time (e.g., an event recognized by the reset control circuitry of administrative function circuitry 120). In other cases, the WRPROT mechanism is implemented in different ways.

The memory protection mechanisms discussed herein (i.e., PCROP, RDPROT, WRPROT) may be operated independently, cooperatively, or independently and cooperatively. The protections may desirably interact, and in many cases, the protections are implemented as a safety chain. That is, if any one protection mechanism prohibits access to a particular portion of memory 114, then the access is prohibited regardless of whether or not others of the protection mechanisms permit or prohibit the subject access.

Optionally, a firewall memory protection mechanism may also be implemented in the control circuitry of microcontroller 100. In some cases, the firewall memory protection mechanism may be formed in a separate and distinct firewall logic 114e module. Alternatively, if the optional firewall logic is included in microcontroller 100, the firewall protection mechanism may be implemented in the circuits of memory 114, in the administrative function circuitry 120, or in some other location of microcontroller 100.

Firewall logic is arranged to protect a specified portion of software code or data in either volatile memory, such as in RAM 114a, or non-volatile memory, such as FLASH 114b. The firewall logic may protect the volatile data from errant or malicious program instructions that are fetched from outside the protected area.

The firewall can be programmatically opened and programmatically closed. Program instructions can read or write data in protected areas when the firewall is opened, and program instructions can be fetched from the protected areas when the firewall is opened. Conversely, when the firewall is closed, any access request into the protected area may generate a reset condition, which immediately stops the detected intrusion. In at least some embodiments, any DMA access into a protected area, regardless of whether the firewall is open or closed, will generate a reset condition.

Firewall logic includes snooping circuits, which may be arranged as dedicated, configurable comparators that monitor traffic on one or more address buses within microcontroller 100. Any desired number of firewall comparator circuits and associated parameter configuration logic may be included in microcontroller 100. In some cases, each firewall comparator circuit may be configured to protect a different section (e.g., segment, block, page, group, and the like) or memory 114. The configurable comparator circuits may be associated with a set of firewall registers that store configuration parameters for the firewall logic. In some cases, one or more firewall control registers define address space protected by the firewall, enable and disable the firewall, control or otherwise direct the actions that will be taken upon unauthorized breach of the firewall, and define other firewall parameters.

Microcontrollers of the type described in the present disclosure may be found in retail devices, consumer devices, industrial equipment, medical devices, vehicles, and devices of nearly any other class or technology area. The devices may be battery powered or powered by a hard-wired source. The devices where microcontrollers are employed may be portable, fixed, or some combination thereof. Without any limitation, microcontrollers are used to take data from sensors of all types (e.g., temperature, time, humidity, acceleration, motion, switches, triggers, and the like), and microcontrollers are used to provide data to the outside world (e.g., visual, audio, and haptic annunciators, switches, triggers, and the like).

Figure 3:
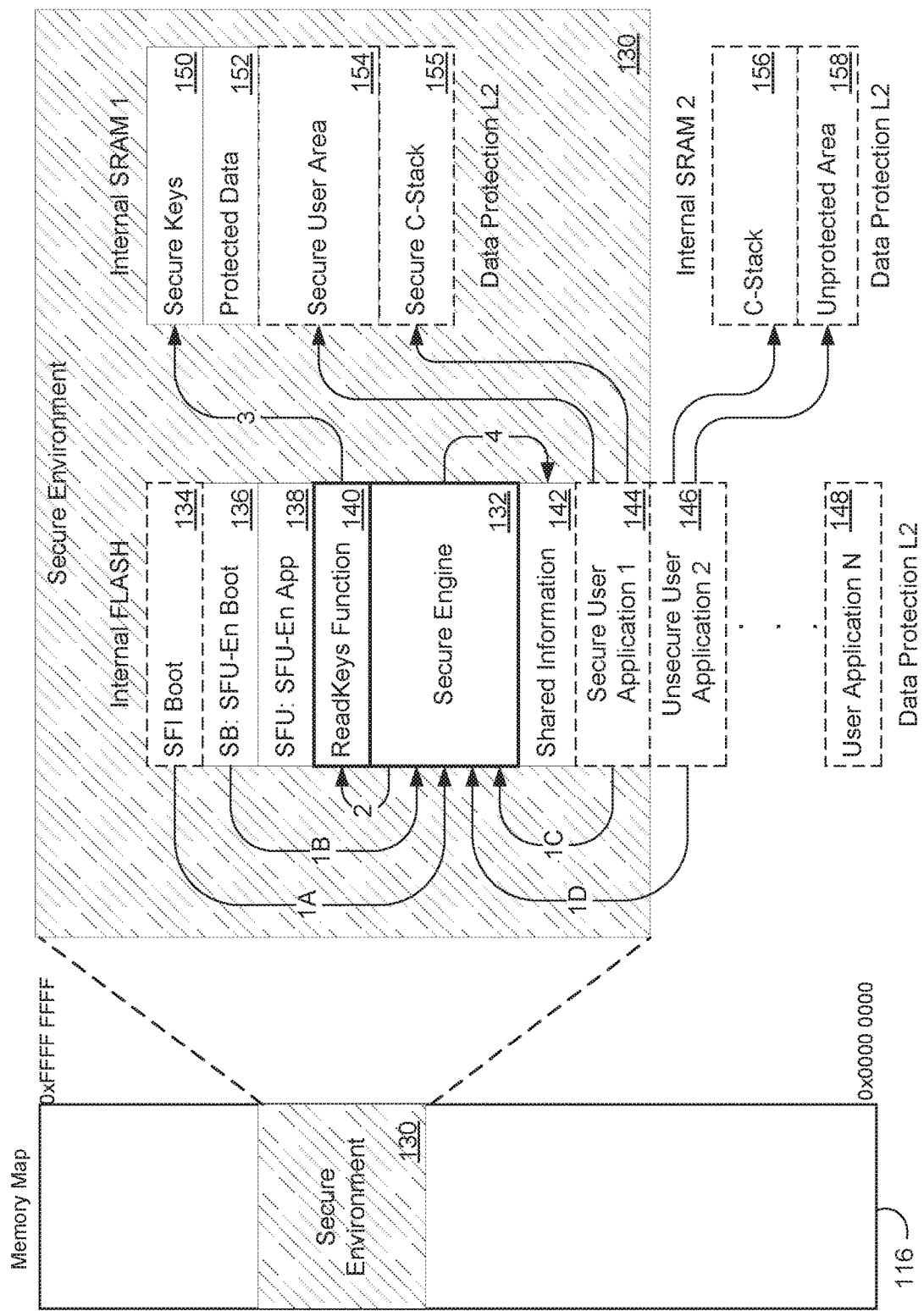
FIG. 3 illustrates an exemplary embodiment of the contents of a secure environment formed in a memory at a location defined in a memory map.

FIG. 3 illustrates an exemplary embodiment of the contents of a secure environment 130 formed in a memory 114 at a location defined in a memory map 116. The secure environment 130 is illustrated in FIGS. 2 and 3 having the appearance of spanning a single contiguous range of addresses, however this is exemplary and in some other embodiments, the secure environment 130 has a first portion in one area of memory having a first set of addresses and a second portion in another, different area of memory having a second set of addresses that are different and non-contiguous with the first set of addresses. In still other embodiments, the secure environment 130 has portions at three or more different and non-contiguous sets of addresses.

An internal SRAM 1 memory, and internal SRAM 2 memory, and an internal FLASH memory are represented in FIG. 3. Here, the internal FLASH memory is illustrated having portions within the secure environment 130 and outside the secure environment 130. Internal SRAM 1 is represented fully within the secure environment 130 and internal SRAM 2 is represented fully outside of secure environment 130. Such boundaries and representations are exemplary, and other boundaries are contemplated. For example, one or more FLASH memories, one or more internal SRAM memories, and still other memory architectures may be included in other embodiments, and in these other embodiments, a secure environment 130 may be arranged in any desirable way.

The secure environment 130 in FIG. 3 has programmed software instructions and data stored in different parts of memory 114. For example, programmed software instructions of a secure engine 132, an optional secure firmware installer 134, secure boot logic 136, secure firmware update 138, and a "readkeys" function 140 are each stored in internal FLASH 114b of memory 114. Certain shared information 142, and one or more optional user applications may also be stored in internal FLASH 114b of memory 114.

It is recognized that in the embodiment of FIG. 3, boundary lines are illustrative and non-limiting. For example, in some cases, a secure firmware installer 134 is integrated with secure boot logic 136. In other cases, the secure firmware installer 134 is not included at all. In these or other embodiments, the readkeys function 140, which retrieves and processes encryption keys, is integrated with the secure engine 132. Accordingly, any number of other functions and functional logic may be included in the secure environment 130.

In the embodiment of FIG. 3, a first secure user application 144 is represented in the secure environment 130. Also in the embodiment of FIG. 3, a second unsecure user application 146 is represented outside of the secure environment 130, and a plurality of other user applications through an "Nth" user application 148 are also outside of the secure environment 130. In other embodiments, more or fewer than one user application are formed within the secure environment 130, and zero or any number of user applications are formed outside of the secure environment 130.

Also in the example of FIG. 3, secure keys 150, protected data 152, and optional secure user area 154 are stored in a first internal static RAM device (e.g., RAM 114a) of memory 114. And optionally, a code stack 156 and an unprotected area 158 are stored in a second internal static RAM device (e.g., RAM 114a) of memory 114.

The secure engine 132, is comprised of a plurality of secure environment software instructions executable by the microprocessor 112. The secure environment software instructions of secure engine 132 are in some cases stored in, and fetched from, internal non-volatile memory (e.g., FLASH 14b). In this way, no address or data bus lines are accessible to hardware-based snooping devices. In addition, or in some alternative cases, the secure engine 132 cannot be updated. In these cases, the secure engine 132 is sometimes loaded by the manufacturer of microcontroller 100 using, for example, the secure firmware installer 134. In other cases, the secure engine 132 may be loaded by an OEM. Fuses or other configuration mechanisms may be employed to physically, electrically, or in some other way prevent updating or otherwise changing the secure engine 132. In these and similar cases, the secure engine 132 can be used to update firmware of another third party device or application, but the secure engine 132 is prohibited from updating itself.

As represented in FIG. 3, the secure engine 132 is a conduit into the secure environment 130 for all applications that need to access, read, write, use, generate, or perform other operations on secret data. The secure engine 132 exposes an application programming interface (API). The API provides a mechanism for standalone applications and other executing software to access secure functions, secure data, or secure functions and secure data inside the secure environment 130.

As shown in FIG. 3 by a first reference designation 1A, optional secure firmware installer 134 logic, when it is included, may call into secure engine 132. A second reference designation 1B is shown in FIG. 3 to represent a secure boot logic 136 module's ability to call into secure engine 132. Third and fourth reference designations 1C and 1D, respectively, represent calls into the secure engine 132 from a first secure user application 144 and a second unsecure user application 146.

After calling into the secure engine 132, the secure engine 132 calls a ReadKeys function to gain access to one or more secure keys 150. Optionally, the ReadKeys function 140 may be integrated with the secure engine 132. Before, during, and after the secure key data usage, the secure engine 132 shares information with user applications, other firmware, and the like via a shared information 142 module.

The first secure user application 144 has some portion of its instructions protected within the secure environment 130, and neither the second unsecure user application 146 nor the Nth user application 148 has instructions protected within the secure environment. The representations in FIG. 3 are not limiting, and zero or any number of user applications may have some or all instructions and some or all data protected within secure environment 130. Along these lines, zero or any number of user applications may have some or all instructions and some or all data outside secure environment 130. And still further along these lines, the number and designation of software modules that are shown in FIG. 3 to call into secure engine 132 are neither limiting nor exhaustive. Other applications, functions, or the like may also access secure functions, data, or functions and data inside the secure environment 130.

The user applications of FIG. 3, when not operating with secret functions or secret data, may fetch instructions from unprotected areas of memory 114 and may access unprotected data from memory 114. Along these lines, when the user applications of FIG. 3 are operating with secret functions or data, such applications are arranged to access protected functions and data from protected areas of memory 114.

The first user application 144 may access data or instructions in secure user area 154, and the first user application may execute software using a secure code stack 155. When the first user application is acting with or acting on secret information, these areas will be restricted using the firewall or another memory protection mechanism that prohibits concurrent access to information inside and outside the secure area 130.

The second unsecure user application 146 is arranged to access instructions and data from an unprotected area 158 and use unprotected code stack 156. When the second unsecure user application 146 calls into the secure engine 132 to request secure operations, however, the second unsecure user application 146 can pass data through the shared information area 142, but any access to instructions or data outside of the secure environment 130 will be suspended. In this way, the second unsecure user application 146 may have secret information available in the shared information area 142, but the second unsecure user application 146 cannot copy this information outside of the secure environment 130. The second unsecure user application 146 will only regain access to the unprotected areas of memory 114 after the secure engine has cleaned up and deleted or otherwise re-secured the secret information.

In some cases, the implementation of the secure user area 154 and secure code stack 155 permits a plurality of secure user applications to coexist and operate serially or concurrently. For example, in some cases, the secure environment architecture is arranged as a platform accessible by any number of parties such as an OEM and one or more users. In this way, a plurality of OEM or user applications may be stored in the secure environment 130, and the OEM or user applications may securely execute functions stored in the secure environment 130 on data stored in the secure environment 130.

When a plurality of secure user applications are arranged in the secure environment 130, the environment may be arranged such that only a single secure user application can access secure functions and data at any given time. In these cases, when one secure application is operating, no other secure applications are permitted to operate. Upon completion, secure data is re-secured and memory used during the secure operations is cleared.

In alternate cases, a plurality of secure user applications may be permitted to concurrently operate. Such concurrent operations are multitasked by performing a context switch between different secure user applications. Each of the multitasked applications may be granted access to allocated portions of secure keys area 150, protected data 152, secure user area 154, and secure code stack 155. In the event that one of the secure user applications is maliciously compromised or includes a software bug or some other flaw that attempts to operate outside of its allocated areas in the secure environment 130, the secure engine 132 is arranged to detect the malicious or other improper activity.

FIG. 4 is a data flow diagram representing use of a secure environment embodiment 130A. The secure environment 130A is formed and executed along the lines of the secure embodiment 130 of FIG. 3. Processing of the secure environment embodiment 130A generally includes initialization, secure engine processing, and cleanup processing. In FIG. 4, the initialization stage embodiment includes secure environment configuration processing at 162 to 172 to prepare for operations of a secure engine 132. The secure engine processing stage embodiment includes operations of the SB/SFU state machine 132A and processing between 176 and 188 inclusive. And the cleanup processing stage embodiment includes further secure environment configuration processing between 190 and 199, inclusive.

In FIG. 4, processing begins at 162 when a boot-sequence is entered. The boot-sequence may be the result of a first power-up, a re-power-up, a hard reset, a soft reset, a trap, a designated interrupt, an unknown or otherwise unexpected interrupt, a memory access violation, or for any other reason.

In some cases, the boot-sequence at 162 is entered in a controlled manner. For example, the boot-sequence at 162 may be entered from the secure firmware installer 134 (FIG. 3). This action is typically performed by the manufacturer of microcontroller 100 or by an OEM. In these cases, the manufacturer or OEM may load memory 114 with all of the parameters that will create and then maintain the secure environment 130. In other cases, the manufacturer or the OEM determines that some portion of the secure environment such as the secure engine 132 will be updated. Once the secure engine 132 is loaded into non-volatile memory 114 (e.g., FLASH 114b) by the manufacturer of microcontroller 100 or an OEM, it is expected but not required that the secure engine 132 will rarely be updated.

In other cases, the boot-sequence at 162 is controllably entered from the secure boot logic 136 or the secure firmware update logic 138. The secure boot logic 136 is desirably entered when a user of an end device where microcontroller 100 is deployed powers-on or power-cycles the end device. This hard reset condition permits the secure boot logic 136 to controllably initialize the secure environment 130. Alternatively, the secure boot logic 136 may also be entered when an anomalous condition is detected in microcontroller 100 or the end device (e.g., unauthorized access to protected memory, unknown or unexpected interrupt, watchdog timer timeout, or the like).

The secure firmware update logic 138 is controllably entered from the secure boot logic 136 or from a software application such as the first, second or Nth user applications 144, 146, 148, respectively. The secure firmware update logic 138 may also be entered in different ways. In some cases, the secure firmware update logic 138 is used to update secure functions that comprise secure environment software instructions executable by the microprocessor 112. These may be functions that encrypt, decrypt, obfuscate, de-obfuscate, generate or manipulate random numbers, or the like. In other cases, the secure firmware update logic 138 is accessed by an OEM or end user service provider that provides firmware for execution on microcontroller 100. Without limitation, such firmware may be used to operate proprietary financial functions on an end device (e.g., a dongle that can be used as a payment device within a proprietary system, a wearable medical device that collects, disseminates, generates, or otherwise stores private medical information, or the like). In these types of cases, the end user service provider is able to take advantage of the security services provided in the secure environment without exposing their own private information to OEM's, manufacturers of microcontroller 100, or other end user service providers that may also operate software on microcontroller 100.

After performing initialization in the initial the boot-sequence at 162, processing advances to 164 where memory is prepared for either access or prohibition. At 164, various checks, enablement, disablement, configuration, and the like are performed using the associated control circuitry of RAM 114*a*, FLASH 114*b*, and the other optional memory-type circuitry 114*c*. The memory protection mechanisms discussed herein (i.e., PCROP, RDPROT, WRPROT), may be used to provide conditional access to secure data and secure functions within the secure environment 130. That is, selected functions (e.g., based on their memory address, based on a programmed parameter, or the like) may be permitted to be executed by microprocessor 112, while other functions are prohibited. In addition, some first selected memory areas may be prohibited from access entirely, while other second selected memory areas are accessible to one or more of the selected secure functions that are permitted to be executed by microprocessor 112. In some cases, the access to memory may be for read only; in some cases, the access to memory may be write only; in some cases, the access to memory may permit reading and writing. Other conditional access may also be configured in processing at 164. For example, memory access to execute secure functions or manipulate secure data may be based on the mechanism of entry into boot-sequence processing at 162 or the actions taken in boot-sequence processing at 162. For example, a memory area that stores the secure engine 132 may be writable only under certain secure boot installer or secure firmware update conditions. As another example, a first memory area that stores secure keys may grant read and write access to a first secure function, but may only grant read access to a second secure function. In some cases, the processing at 164 deploys the RDPROT mechanism at a second protection level by loading a second-level protection value into an RDPROT configuration register. In at least some of these embodiments, a portion of internal non-volatile memory (e.g., FLASH 114*b*) and a portion of internal volatile memory (e.g., RAM 114*a*) are assigned a second-level protection (i.e., "Data Protection L2").

Processing advances to 166 where direct memory access (DMA) controllers are disabled. DMA controllers, which can be configured to autonomously transfer data into or out from various areas of memory 114 without using microprocessor 112 to perform the transfer, are prohibited from operating. This disabling of DMA controllers may in some cases be implemented via parameters loaded into internal registers of microcontroller 100. Alternatively, or in addition, this disabling of DMA controllers may in some cases be implemented in hardware, for example using a particular switch-based (e.g., a transistor-based) circuit. After the DMA controllers are disabled, processing advances to 168.

At 168, various memory security functions are enabled, programmed, verified, or otherwise arranged. For example, hardware-based anti-tamper are configured to detect, and some cases timestamp, any tampering of memory 114. Such detection may in some cases also be combined with purposeful corruption of selected portions of memory 114 to prevent a malicious hacker from accessing the secret data when the tampering event occurs. As another example, one or more debug access port (DAP) functions may be enabled, disabled, or selectively configured for operation. In some cases, no debug access is permitted during certain selected operations of the security environment 130. In some cases, the configuration of debug access is implemented partially or exclusively with a hardware-based circuit.

Processing at 170 begins after the particular memory security functions of 168 are completed. The processing at 170 includes enablement of a defined memory protection area (MPU). In some cases, processing at 170 configures the microcontroller 100 to disable any execution of instructions that were fetched from non-volatile memory (e.g., RAM 114*a*). This feature is in some cases implemented using a particular MPU circuit that monitors internal addressing architecture of microcontroller 100. Based on the organization of memory 114 (e.g., as exemplified in a memory map 116), the hardware circuit will detect an attempt to pass instructions fetched from non-volatile memory to an execution unit of microprocessor 112. Upon detection of such an unauthorized event, the hardware circuit may prohibit the passage of such instruction or otherwise raise an alert (e.g., interrupt, trap, or the like) that such unauthorized access is occurring.

Processing at 170 may also be configured to disable access to all other memory except for that which is expressly permitted. The particular permissions may be based on addresses defined in memory map 116. The particular permissions may have any desirable level of granularity (pages, sections, blocks, words, bytes, and the like), which may even be configurable by a user.

Optionally, if firewall protection logic is included in microprocessor 100, the firewall is enabled in processing at 172, after the MPU protection processing of 170 has been performed. As described in the present disclosure, the firewall logic is arranged to protect specified programmed software instructions or specified data in either volatile memory or non-volatile memory using particular snooping circuits. After the firewall is enabled at 172, access to nearly all of memory 114 is prohibited. Processing advances to 132A, which operates as a secure boot/secure firmware update (SB/SFU) state machine.

The SB/SFU state machine 132A is represented in FIG. 4 as having a first portion outside of the secure engine 132 and a second portion inside the secure engine 132. In these embodiments, some portions of the state machine are only accessible from within the secure environment 132 and other portions of the state machine are accessible from outside the secure environment 132. Other embodiments are contemplated where the SB/SFU state machine 132A is entirely contained within the secure environment 132.

At 132A, instructions executed by microprocessor 112 are fetched from non-volatile memory (e.g., FLASH 114*b*) that is physically located internal to microcontroller 100. That is, in cases where microcontroller 100 is arranged as an integrated circuit, the secure environment software instructions executable by the microprocessor 112 to implement the SB/SFU state machine 132A are fetched from a physical memory structure inside the integrated circuit package.

When executing the secure environment software instructions of the SB/SFU state machine 132A, a user of microcontroller 100 can have confidence that no other access to memory 114 is permitted. In addition, if any malicious or errant access to a now-protected area of memory is attempted, then microcontroller 100 will force re-entry into the boot-sequence at 162 of the data flow of secure environment embodiment 130A. Microprocessor 112 will not permit any operations to access memory 114 until the boot-sequence at 162 exits and further processing in the data flow of secure environment embodiment 130A is performed.

Operations of the secure engine processing of SB/SFU state machine at 132A are directed by the processing during the boot-sequence at 162, and subject to at least some of the memory access conditioning performed at 164-172. For example, if processing in the SB/SFU state machine at 132A followed an error condition or another unexpected entry into the boot-sequence at 162, then processing from 132A may optionally pass to 190 or in some cases to 199. Alternatively, if processing in the SB/SFU state machine at 132A followed a controlled entry into the boot-sequence at 162, then certain access to secure functions, secure data, or secure functions and secure data of the secure environment 130 will be granted. In these cases, processing advances to an optional function that enters a protected enclave at 176.

The protected enclave at 176 represents one or more application programming interfaces (API's). In some cases, a first-level API is directed toward secure core functions. The first-level API is exposed only to the secure engine 132 and other internal secure functions of the secure environment. A second-level API is directed toward both internal secure core functions and third party or otherwise un-secure functions. With respect to FIG. 3, for example, first-level API functions include a set of routines, protocols, instructions, frameworks, and the like that expose secure firmware installer 134 functions, secure boot logic 136 functions, secure firmware update logic 138 functions, and readkeys functions 140. First-level API functions may also include other internal secure functions of the secure environment such as functions that copy data, allocate secure space, perform cryptographic operations, and the like. Also with respect to FIG. 3, for example, second-level API functions expose the secure engine 132, expose access to shared information 142, and expose wrappers for indirect access to any number of secure functions such as request for secure key information, encryption, decryption, signature verification, reading or writing secret data, and other such functionality. In some cases, where an express processing to enter a protected enclave at 176 is implemented, the exposure of the first-level API's, second-level API's, or first- and second-level API's is an express exposure. In other cases, where an express processing to enter a protected enclave at 176 is not implemented, the exposure permitted or restricted of secure API's is persistent when microcontroller 100 is operating.

Processing passes from the SB/SFU state machine at 132A, through the processing at 176 when implemented, to 178 wherein interrupts are disabled. In some cases, all interrupts are disabled, and processing of secure environment software instructions executable by the microprocessor 112 continues. In some cases, critical interrupts (e.g., traps, errors, soft-resets, and the like) are processed by a forced re-entry into the boot-sequence at 162 of the data flow of secure environment embodiment 130A. A hard reset (e.g., power-cycle, user-forced hard reset, and the like) will also force re-entry into the boot-sequence at 162. Interrupts are disabled to prevent the microprocessor 112 from executing any instructions not expressly sequenced by the desired secure environment software instructions.

After interrupts are disabled at 178, processing advances to 180. At 180, if a firewall is implemented, a call gate function opens one or more areas of access within the secure environment. Once a secure area through the firewall is opened, processing advances to 182.

At 182, any number of secure functions may be performed. The secure functions may be exposed via first-level API calls from the other secure functions. At least some of the secure functions may be exposed via second-level API calls from user applications. For example, an insecure user application may request secure key information, encryption services, decryption services, signature verification, access to secret data stored or to be stored in the secure environment, and other such functionality. FIG. 4 illustrates processing at 182 that includes copying secure keys into volatile RAM, using the copied keys, and performing secure processing; nevertheless, it is recognized that any type of secure function processing may be performed at 182, and authorized use of any secret data may be performed at 182.

After secure processing at 182 (i.e., one or both of performance of secure functions and access to secure data), processing optionally advances to 184. If a firewall is implemented in microcontroller 100, then the call gate function closes the one or more areas of access within the secure environment that were opened at 180. In some cases, a single "call gate" function take parameters to open areas of access within the secure environment, close areas of access within the secure environment, or otherwise manage particular characteristics of the secure environment (e.g., permissions, identifiers, sizes, semaphores, tracking data, status data, and the like). In other cases, functionality of the firewall is distributed amongst two or more call gate functions (e.g., an "OpenCallGate( ) function, a CloseCallGate( ) function, a ManageCallGate( ) function, and the like).

Processing at 180 to 184 includes processing that happens under firewall protection when a firewall is implemented as indicated by the dotted lines 172A. Such processing is alternatively or additionally subject to processing restrictions of microprocessor 112 and memory 114 implemented at 162 to 176. In this way, resources of a non-secure microcontroller that are arranged in a selected secure environment can be desirably permitted or restricted with confidence that the restricted resources are not available to unauthorized users.

After closing the firewall if it exists, or after secure processing at 182, the interrupts that were disabled at 178 are re-enabled at 186. And if exposure of secure processing API's is express at 176, then the exposure granted at 176 is re-restricted at 188.

Processing returns to the SB/SFU state machine at 132A, and if the secure processing tasks are completed, then processing optionally advances to 190 or 199.

When it has been determined that entry to the secure environment 130A was improper, processing falls from the SB/SFU state machine at 132A to 199. In addition, or in the alternative, if it has been determined that improper actions were taken within the secure environment 130A (e.g., between 176 and 188), processing falls from the SB/SFU state machine at 132A to 199. In these or still other cases, when activities in the embedded controller are determined to be incorrect, malicious, or otherwise suspicious, processing falls to 199.

At 199, the embedded controller may in some cases enter a permanently or temporarily stalled state. In the stalled state, certain memory such as internal SRAM, general purpose registers, special registers, peripheral control registers, or other memory logic may be quarantined, captured, interrogated, or treated in another purposeful manner. These and other actions may be taken to help identify a malicious attack, software bugs, or for other reasons. In cases where the stall was temporary, or where the controller was not stalled at all, processing will advance back to a boot-sequence at 162.

At 190, a graceful exit process from the secure environment 130A is started. Processing has advanced from the SB/SFU state machine at 132A, and no suspicious activity has been detected. At 190, areas of non-volatile memory that were used by the secure processing can be cleared. In some cases, clearing areas of non-volatile memory includes programming a selected initialization value (e.g., zero) into the area to be cleared. In some cases, all non-volatile memory is cleared. In other cases, obfuscation data such as random numbers may be loaded into determined areas of non-volatile memory. And in still other cases, memory of the secure environment, which is not freely accessible, is not cleared at all. Processing at 190 optionally advances to 192 if firewall logic is implemented in microcontroller 100, and at 192, if the firewall logic has been particularly configured for use of the secure engine 132, the firewall logic is restored to its previous state from that which was set at 172. Alternatively, or after firewall logic processing at 190 is initiated, processing advances to 194. At 194, any enablement of a defined memory protection area (MPU) performed at 170 is reversed. At 194, the state of microprocessor 112 and unprotected areas of memory 114 are effectively restored to the previous status prior to use of the secure functionality of secure environment 130.

Processing advances from 192, through 196, where instructions of a user application or another function are fetched. As in conventional programming, the processing at 196 may be implemented as a return from an executed subroutine.

Figure 5:
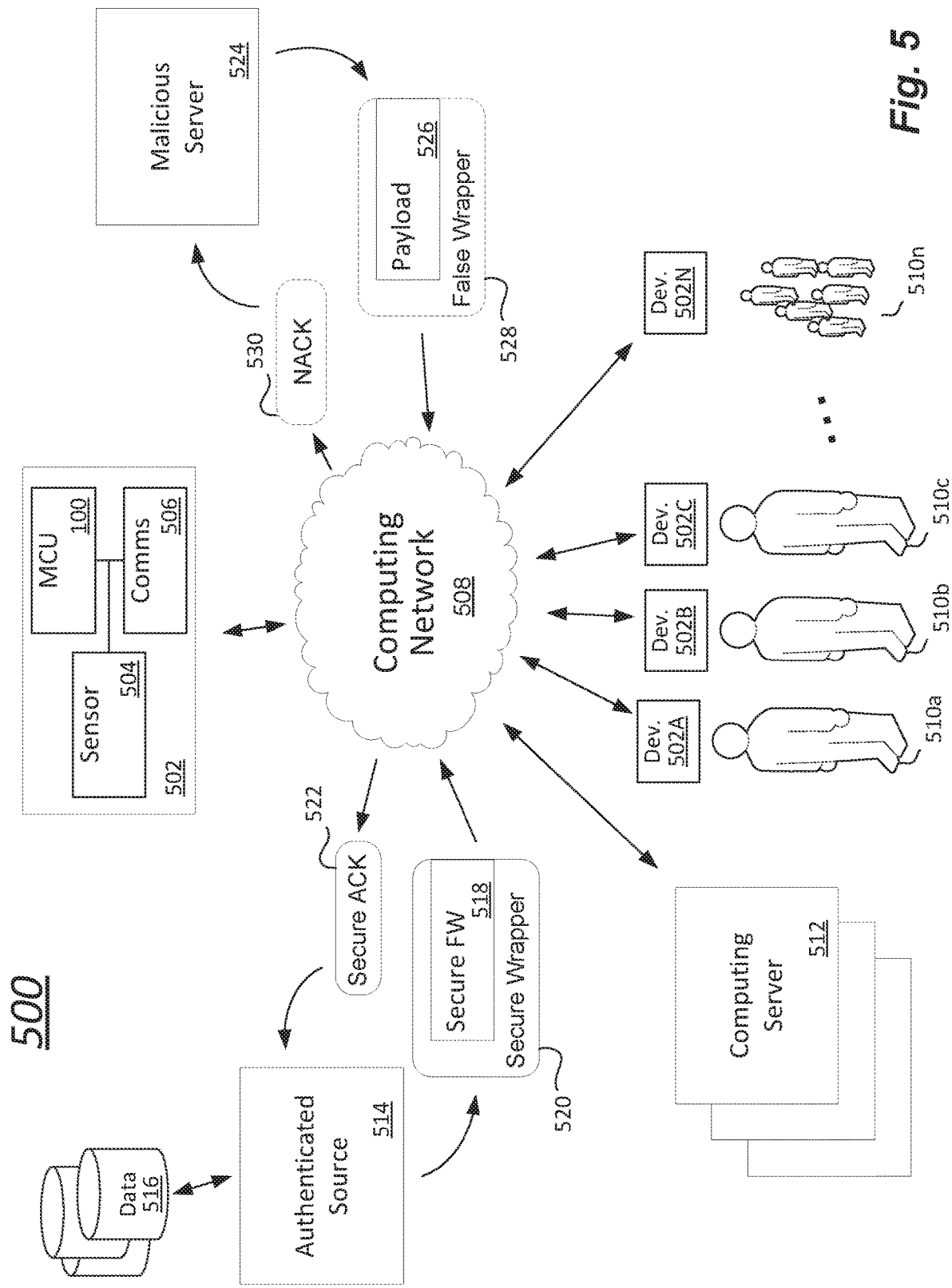
FIG. 5 is a data flow diagram representing implementation of a plurality of secure environment embodiments.

FIG. 5 is a data flow diagram representing implementation of a plurality of secure environment embodiments 500. An end device 502 comprises a microcontroller 100 of the type described in the present disclosure along with at least one sensor device 504 and a communications interface 506. The end device 502 is arranged to communicate via a network 508.

Along with the end device 502, a plurality of users 510a, 510b, 510c, to 510n are each associated, respectively, with at least one end device 502A, 502B, 502C, 502N. Communication interfaces of the end devices permit the end devices to communicate, via network 508, to other computing devices such as each other, a first computing server 512, a second computing server 514, a third computing server 524, and other computing servers (not shown).

In a non-limiting, non-exhausting way, directional arrows in FIG. 5 illustrate communicative couplings between computing devices and network 508. Other communications and communicative couplings between devices may also be arranged or otherwise included and not shown so as to simplify the illustration. The communications of FIG. 5 may include communications based on any one or more of a telecommunications (e.g., cellular) protocol, a satellite protocol, a cable-services protocol, an Ethernet protocol, a universal serial bus (USB) protocol, a Bluetooth protocol, a WiFi protocol, a near field communications (NFC) protocol, radio frequency identifier (RFID) protocol, and any other type of wired and wireless data communications protocol.

Network 508 may be a wide area network (WAN) such as the Internet, a local area network (LAN), a personal area network (PAN), a peer-to-peer network, or some other type of network. Various portions and protocols of network 508 may cooperate to provide seamless communications between any of the computing devices of FIG. 5 (e.g., end device 502, computing server 512, and the like). The various portions and protocols of network 508 may include, but are not limited to, any of the protocols employed by any of the computing devices described in the present disclosure.

The end devices of the present disclosure, which include end device 502 and end devices 502A-502N may be any type of end device wherein a secure environment is desirably formed in a non-secure microcontroller. Non-exhaustively, in an exemplary and non-limiting list, the end devices of the present disclosure may be mobile computing devices such as wearable computing devices (e.g., fitness devices, personal security device, personal identification devices, and the like), automotive computing device, drones, robots, payment devices, health or other medical devices, and the like; fixed computing devices such as credit card machines, point-of-sale (POS) terminals, public utility meters (e.g., water, electricity, and the like), industrial equipment, home and commercial appliances, heating, ventilation, and air conditioning (HVAC) devices, smart plug devices, smart power devices, and the like; and any other type of computing device where an environment such as secure environment 130 is desirably formed in a non-secure computing device such as microcontroller 100.

In a secure communications embodiment illustrated in FIG. 5, a firmware update is planned for a secure mobile device such as a payment device. The payment device may be arranged as end device 502. The communications interface 506 in this first embodiment may follow a telecommunications protocol, and the sensor 504 may be any of a motion sensor, light sensor, communications detection sensor, power level sensor, or any other kind of sensor. In some cases of the present first embodiment, the sensor 504 may not even be implemented.

In this secure communications embodiment, the process to update firmware in the secure mobile payment end device 502 may be started by the end device 502, by computing server 512, or by some other source. In this case, the computing server 512 cooperates with a trusted source 514, which can be an authenticated third party trusted source that is related or not related to the computing server 512. Working cooperatively with a secure data source 516 (e.g., a secure database, a secure data computing device, or the like), the trusted source 514 prepares the updated secure firmware 518 within a secure wrapper 520. The secure wrapper can be formed in cooperation with secure computing data and functions of the type described in the present disclosure. For example, a sending device can encrypt data using a secure key that is known, shared, derivable, or corresponding to a secure key of the receiving device. Because of its corresponding secure key, the receiving device can decrypt and verify the received data. In one or more packets, streams, or other formations, the updated secure firmware 518 within a secure wrapper 520 is communicated to the secure mobile payment end device 502.

When the updated firmware is received at the communications interface 506 of the secure mobile payment end device 502, a boot-sequence at 162 (FIG. 4) commences and proceeds as described in connection with FIG. 4 herein. The receipt and recognition of the secure wrapper 520 causes entry into processing of the secure engine 132. Secure functions of the secure engine 132 are arranged to process the updated secure firmware 518 and store the updated firmware 518 appropriately in a secure area of memory 114 (FIG. 2). Having successfully updated its firmware, the secure mobile payment end device 502 will form and communicate a secure acknowledgement 522 back to the trusted source 514.

In a hacking detection embodiment illustrated in FIG. 5, a hacker controlling a malicious computing server 524 has a desire to hack into a network of smart power meters. The network of smart power meters may be those devices 502N associated with that plurality of users 510n. Sensors associated with the smart power meters may be any type of sensor associated with an electric utility meter such as a flow sensor, an anti-tampering sensor, a light sensor, a motion sensor, or the like. In this case, the hacker may use malicious computing server 524 to send a payload 526. The payload may include false data, malicious computing functions, or some other nefarious information. A false wrapper 528 of any formation encapsulates the malicious payload 526. The false wrapper 528 may be a first attempt by the hacker, second attempt, hundredth attempt, millionth attempt or any other attempt. Because of the secure environment 130 created in the microcontroller 100 of each smart power meter end device 502N, the malicious payload 526 cannot be delivered, installed, executed, or otherwise successfully deployed by the hacker. When the malicious false wrapper 528 is detected, the boot-sequence at 162 (FIG. 4) will begin to lock down the computing resources of microcontroller 100 in a controlled way. Without proper authentication, the malicious payload 526 will not have any opportunity to access, execute, or otherwise engage with any secure data of the secure environment.

In some cases, having failed to operate, execute, or the like, the smart power meter end device 502N may prepare and deliver a not acknowledgement (NACK) message back to the source computing device (i.e., malicious computing server 524). In some cases, the NACK message is reported to computing server 512, a trusted source 514 computing server, or some other computing server to raise an alert of the hacking attempt.

It is recognized herein that each of the terms, "security keys," "secure keys," "cryptographic keys," "decryption keys," and "encryption keys," and the like has different meanings in particular contexts. Because the specific "keys" or types thereof are not directly essential to the inventive subject matter described herein, the term "secure key" in all of its grammatical forms is used interchangeably with any particular secure key of any particular secure key type as the context allows.

As used in the present disclosure, the term "module" may refer to an electronic circuit, a processor and a memory operative to execute one or more software or firmware programs, combinational logic circuitry, or other suitable components (hardware, software, or hardware and software) that provide the functionality described with respect to the module.

FIGS. 3 and 4 are data flow diagrams illustrating processes or functions that may be used by embodiments of microcontroller 100. In this regard, each described process may represent a module, segment, or portion of code, which comprises one or more executable instructions for implementing the specified logical function(s). It should also be noted that in some implementations, except where an order is expressly stated, the functions noted in the process may occur in a different order, may include additional functions, may occur concurrently, and/or may be omitted.

FIG. 5 illustrates various computing server devices such as computer server 512 and trusted source computing server 514. These computing server devices include operative hardware found in a conventional computing server apparatus such as one or more central processing units (CPU's), volatile and non-volatile memory, serial and parallel input/output (I/O) circuitry compliant with various standards and protocols, wired and/or wireless networking circuitry (e.g., a communications transceiver).

As known by one skilled in the art, a computing server has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory.

Computing servers further include operative software found in a conventional computing server such as an operating system, software drivers to direct operations through the I/O circuitry, networking circuitry, and other peripheral component circuitry. In addition, computing servers include operative application software such as network software for communicating with other computing devices, database software for building and maintaining databases, and task management software for distributing the communication and/or operational workload amongst various CPU's. In some cases, the computing servers described in the present disclosure are a single hardware machine having the hardware and software listed herein, and in other cases, the computing servers are a networked collection of hardware and software machines working together in a server farm to execute at least some of functions described in the present disclosure.

When so arranged as described herein, each computing device described in the present disclosure may be transformed from a generic and unspecific computing device to a combination device comprising hardware and software configured for a specific and particular purpose.

In the foregoing description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A secure engine method, comprising:
providing a secure environment in an internal memory of a microcontroller, the secure environment having secure engine program instructions executable by a microprocessor of the microcontroller;
restricting user-level access to the secure environment;
recognizing a boot-sequence of the microcontroller; and
in response to recognizing the boot-sequence:
disabling all direct memory access (DMA) controllers of the microcontroller that are configured to access memory of the secure environment;
configuring at least one memory controller of the microcontroller for access to the secure environment;
permitting access to memory outside the secure environment based on access permissions defined in a memory map for addresses of the internal memory, the memory map having a user-configurable granularity;
preventing the microprocessor of the microcontroller from executing instructions fetched from outside the secure environment;
executing various ones of the secure engine program instructions as a state machine, said executing including:
disabling interrupts;
performing at least one secure operation after interrupts are disabled; and
enabling interrupts after performing the at least one secure operation;
clearing the internal memory;
restoring an enabled/disabled status of each DMA controller disabled after recognizing the boot-sequence; and
performing user-level operations.

2. The method of claim 1 wherein the secure engine program instructions executable by the microprocessor of the microcontroller are stored in a non-volatile memory.

3. The method of 1 wherein the microcontroller is an embedded microcontroller in an embedded device, and wherein the at least one secure operation includes a secure boot of the embedded device.

4. The method of claim 1 wherein the microcontroller is an embedded microcontroller in an embedded device, and wherein the at least one secure operation includes an update to firmware of the embedded device.

5. The method of claim 1 wherein the at least one secure operation includes a signature verification function.

6. The method of claim 1 wherein the act of performing at least one secure operation includes accessing protected cryptic values.

7. The method of claim 1 wherein the microcontroller is an embedded microcontroller in an embedded device, and wherein the embedded device is a wearable device.

8. The method of claim 1 wherein the microcontroller is an embedded microcontroller in an embedded device, and wherein the embedded device is an Internet of Things device.

9. The method of claim 1, comprising:
after recognizing the boot-sequence, enabling a firewall to protect the secure environment, wherein executing various ones of the secure engine program instructions as the state machine includes executing a call gate function to open an area of access within the secure environment.

10. The method of claim 9, comprising:
after performing at least one secure operation, executing a second call gate function to close the area of access within the secure environment.

11. The method of claim 1 wherein the memory map is configurable at page, word and byte granularity levels.

12. An Internet of Things (IoT) device, comprising:
a microcontroller having a microprocessor and a memory configured internal to the microcontroller, the internal memory having a secure environment configured therein, the secure environment having secure environment configuration instructions executable by the microprocessor and secure engine program instructions executable by the microprocessor, the microprocessor directed to:
restrict user-level access to the secure environment;
recognize a boot sequence of the microcontroller;
in response to recognizing the boot sequence and via the secure environment configuration instructions:
disable each direct memory access (DMA) controller that is configured to access memory of the secure environment;
configure at least one memory controller for access to the secure environment;
permit access to memory outside the secure environment based on access permissions defined in a memory map for addresses of the internal memory, the memory map having a user-configurable granularity; and
prevent the microprocessor from executing instructions fetched from outside the secure environment;
via the secure engine program instructions executed as a state machine:
disable interrupts;
perform at least one secure operation after interrupts are disabled; and
enable interrupts after performing the at least one secure operation; and
via the secure environment configuration instructions:
clear the internal memory;
restore an enable/disable status of each DMA controller disabled after recognizing the boot-sequence; and
perform user-level operations.

13. The IoT device of claim 12 wherein the IoT device is arranged as a wearable computing device.

14. The IoT device of claim 12, comprising:
a communications interface; and
at least one sensor, the at least one sensor arranged to provide sensor data to the microcontroller.

15. The IoT device of claim 12 wherein the at least one secure operation is a cryptographic operation.

16. The IoT device of claim 12 wherein the at least one secure operation is a secure key operation.

17. The IoT device of claim 12 wherein the memory map is configurable at page, word and byte granularity levels.

18. A non-transitory computer-readable storage medium whose stored contents configure a computing system to implement a secure engine method, the secure engine method comprising:
- providing a secure environment in an internal memory of a microcontroller, the secure environment having secure engine program instructions executable by a microprocessor of the microcontroller;
- restricting user-level access to the secure environment;
- detecting a boot-sequence, and in response to detecting the boot-sequence:
  - disabling all direct memory access (DMA) controllers of the microcontroller that are configured to access memory of the secure environment;
  - configuring at least one memory controller of the microcontroller for access to the secure environment by the secure engine;
  - permitting access to memory outside the secure environment based on access permissions defined in a memory map for addresses of the internal memory, the memory map having a user-configurable granularity;
  - preventing the microprocessor of the microcontroller from executing instructions fetched from outside the secure environment;
  - executing secure engine program instructions as a state machine, said executing including:
    - disabling interrupts;
    - performing at least one secure operation after interrupts are disabled; and
    - enabling interrupts after performing the at least one secure operation;
  - clearing the internal memory;
  - re-enabling the disabled DMA controllers; and
  - performing user-level operations.

19. The non-transitory computer-readable storage medium of claim 18 whose stored contents configure the computing system to perform the method, the method further comprising:
- after detecting the boot-sequence, enabling a firewall to protect the secure environment, wherein performing the at least one secure operation includes executing a call gate function to open an area of access within the secure environment.

20. The non-transitory computer-readable storage medium of claim 19 whose stored contents configure the computing system to perform the method, the method further comprising:
- after performing the at least one secure operation, executing a second call gate function to close the area of access within the secure environment.

21. The non-transitory computer-readable storage medium of claim 18 whose stored contents configure the computing system to perform the method, wherein the at least one secure operation includes a secure boot operation.

22. The non-transitory computer-readable storage medium of claim 18 whose stored contents configure the computing system to perform the method, wherein the at least one secure operation includes a secure firmware update operation.

* * * * *